United States Patent [19]
Plemmons et al.

[11] Patent Number: 4,485,832
[45] Date of Patent: Dec. 4, 1984

[54] AUTOMATIC GAS SHUT-OFF VALVE

[76] Inventors: J. Robert Plemmons, 1005 Parkhill Dr.; Donald G. Rieck, 2525 Orange Ave., both of Costa Mesa, Calif. 92627

[21] Appl. No.: 423,030

[22] Filed: Sep. 24, 1982

[51] Int. Cl.³ .............................................. F16K 17/36
[52] U.S. Cl. ...................................................... 137/38
[58] Field of Search ........................................ 137/38, 39

[56] References Cited

U.S. PATENT DOCUMENTS

| | | | |
|---|---|---|---|
| 2,215,044 | 9/1940 | Kammerdiner | 137/38 |
| 2,585,316 | 2/1952 | Hobson | 137/38 |
| 2,927,592 | 3/1960 | Ferre | 137/38 |
| 3,747,616 | 7/1973 | Lloyd | 137/38 |
| 3,768,497 | 10/1973 | Mueller | 137/38 |
| 4,212,313 | 7/1980 | Winters | 137/39 |
| 4,331,171 | 5/1982 | Novi | 137/38 X |

FOREIGN PATENT DOCUMENTS

| | | | |
|---|---|---|---|
| 48847 | 4/1977 | Japan | 137/38 |
| 51179 | 4/1980 | Japan | 137/38 |

Primary Examiner—Robert G. Nilson

[57] ABSTRACT

There is shown and described a shock actuated, shut-off valve for fluid flow lines which includes a valve housing having an inlet conduit, an outlet conduit and a central chamber which communicates between the inlet and outlet conduits. A channel is provided around the interior of the valve above the central chamber. A ball normally rests in the channel. The central chamber is adapted to selectively receive the ball from the channel in a position between the inlet and outlet conduits thereby to selectively interrrupt fluid flow through the valve. A reseating mechanism is provided at the bottom of the valve wherein the ball can be selectively removed from the closure position and returned to the channel.

10 Claims, 3 Drawing Figures

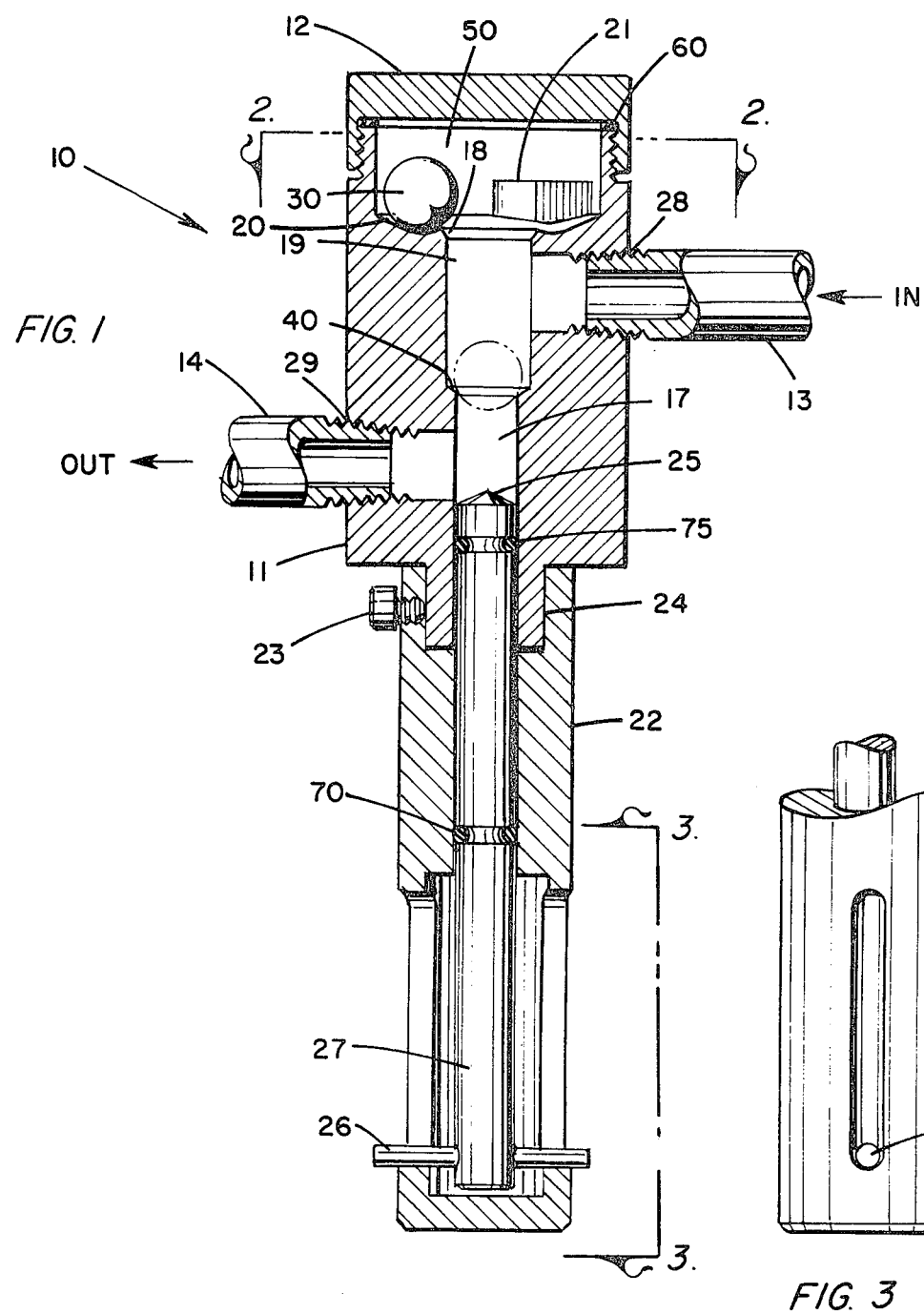
FIG. 2
FIG. 1
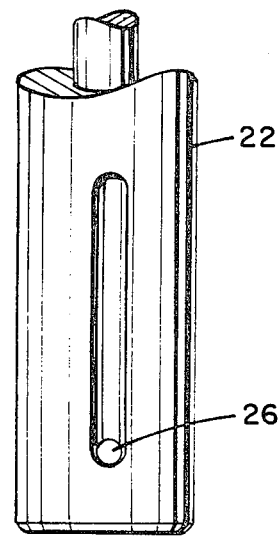
FIG. 3

AUTOMATIC GAS SHUT-OFF VALVE

BACKGROUND

1. Field of the Invention

This invention is directed to valves, in general, and to valves which automatically close off fluid flow therethrough in response to a shock of predetermined intensity, in particular.

2. Prior Art

In areas in which earthquakes may be expected, it is highly advantageous to have a means for controlling the supply of various fluids such as, but not limited to, gas to a dwelling, residence or the like. That is, it is desirable to have the valve arranged to automatically close and interrupt the flow of the fluid therethrough upon the occurrence of a shake or shock of a predetermined magnitude. By using such a valve, the gas supply, for example, is immediately interrupted and precludes the occurrence of a gas-fed fire.

There are many known valves available at present for producing or performing similar purposes. However, most of these valves are relatively expensive and/or complex in construction. In addition, some of the valves are highly sensitive and, therefore, of questionable value or a nuisance insofar as being undesirably triggered by relatively low-level shocks such as passing vehicles or the like.

On the other hand, some of the valves are so complex as to give the appearance of gimmickry or the like. In this particular application, it is most desirable to have a relatively simple, reliable and inexpensive valve apparatus available. The inexpensiveness will permit widespread usage of such a valve. The reliability is highly desirable in order to perform the desired function without fail. The simplicity is highly desirable to enhance the reliability in the cost-effectiveness of the valve.

PRIOR ART STATEMENT

The most pertinent prior art known to applicant is listed herewith.

U.S. Pat. No. 406,290; Safety Valve for Car Heaters; C. F. Murdock. This patent shows a valve which is opened when a weighted ball moves to an outer channel of the disk member.

U.S. Pat. No. 2,771,900; Liquid Seals; B. B. Dayton. This patent shows a valve which is selectively sealed by means of a metal ball which is selectively activated by a magnet device.

U.S. Pat. No. 2,927,592; Shock Actuated Valves; R. S. Ferre, Sr. This patent is directed to a shock-actuated valve wherein a ball is mounted on a bracket until selectively displaced therefrom in which case the ball falls into, and hopefully, seals the inlet line.

U.S. Pat. No. 3,783,887; Self-closing Valve Device. This patent is directed to a self-closing valve device wherein a ball is maintained in an inactive position by means of a magnet until selectively displaced by means of a pressure differential through the valve.

U.S. Pat. No. 4,111,220; Shake Responsive Valve; H. K. Winters. This patent is directed to a valve wherein a ball resides on a pedestal until displaced therefrom in which case the ball is directed to fall into a seat in the outlet portion of the valve. The ball is restored to the pedestal by a rotatable plug which includes a centering notch therein.

U.S. Pat. No. 4,116,209; Shock Actuated Shut-off Valve; C. W. Greer. This patent teaches a valve wherein a valve closing element is retained, magnetically, in a stowage area until displaced into a valve closing position.

U.S. Pat. No. 4,207,912; Emergency Shut-off Valve; K. Ichikawa. This patent is directed to a valve wherein a valve closing means is electromagnetically maintained in an open position until selectively dislodged to a closed position. A plunger device is used to return the closing actuator to the electromagnetically stored position.

U.S. Pat. No. 4,278,102; Disaster Activated Shut-off Valve; C. H. Kelley et al. This patent is directed to an automatic shut-off valve wherein a ball maintains a spring loaded valve seat in the open condition until the ball is dislodged by a shock or the like wherein the valve apparatus seats and closes the valve.

U.S. Pat. No. 4,331,171; Earthquake Shut-off Valve for Gas Line; S. Novi. This patent is directed to a main ball mounted on a spring pedestal, as well as a plurality of wire suspended balls all of which are adapted to knock the main ball from the spring pedestal to effectively close the valve in response to a shock applied to the valve.

SUMMARY OF THE INVENTION

This invention is directed to a valve wherein a channel is provided at the interior of the valve casing. A ball is placed in the channel. The channel is arranged to retain the ball therein unless and until a shock of a predetermined magnitude, e.g. 4.5 on the Richter scale, is encountered. At this point, the ball is effectively dislodged from the channel and falls into a valve seat which is intermediate the input and output conduits associated with the valve casing. The ball, thus, blocks the valve and interrupts flow therethrough.

In addition, a plunger-type apparatus is associated with the valve casing in such a manner as to permit the ball to be removed from the valve seat and to be returned to the channel wherein the valve is reopened for fluid passage therethrough.

BRIEF DESCRIPTIONS OF THE DRAWINGS

FIG. 1 is a partially broken away, sectional view of the valve of the instant invention.

FIG. 2 is a top view of the valve with the top thereof removed.

FIG. 3 is a side view of a portion of the valve of the instant invention.

DESCRIPTION OF A PREFERRED EMBODIMENT

Referring now to FIGS. 1, 2, and 3, concurrently, the instant valve is described. In each of the Figures, similar elements or components bear similar reference numerals.

In particular, valve 10 includes a substantially cylindrically shaped outer casing 11. Casing 11 may have any suitable or desirable outer configuration. However, cylindrical is believed to be the least cumbersome and most cost effective configuration in terms of manufacturing. Casing 11 includes an inlet aperture 28 which, in a preferred embodiment includes at least a portion thereof which is threaded to receive an inlet source 13 such as a threaded pipe or the like. In addition, casing 11 includes a threaded outlet aperture 29 which is adapted to engage an outlet source 14 which can also be a threaded pipe or the like. The inlet pipe 13 is connected to the source of the fluid, such as a natural gas line or the like. The outlet pipe 14 is connected to the user' apparatus such as household appliances or the like. The inlet aperture 28 can be formed integrally with or as a part of an inlet conduit 15. The outlet port 29, similarly, can be formed integrally with or as a part of outlet conduit 16. Conduits 15 and 16 represent bores or channels extending radially into casing 11. Typically, although not limited thereto, conduits 15 and 16 are aligned with each other so that inlet pipe 13 and outlet pipe 14 are essentially in line with each other in a vertical plane through the valve. However, the outlet pipe 14 is disposed below inlet pipe 13 in different horizontal planes.

A central bore or channel 17 is provided in casing 11. This bore extends along the axis of the casing and intersects and communicates with conduits 15 and 16. The central chamber 17 extends through an opening in the bottom of the casing 11 which can be threaded in a nipple 11A which extends below the bottom surface of casing 11.

In the embodiment shown in FIG. 1, the extended nipple arrangement is provided. In this case, sleeve 22 is threadedly engaged with nipple 11A. Sleeve 22 is further secured to the nipple by a set screw 23. The sleeve 22 supports a rod 27 with a cross member 26 attached thereto. The rod 27 is adapted for being selectively pushed upwardly through sleeve 22 and chamber 17. That is, the rod 27 terminates in a disk 25. The disk 25 is arranged to closely fit within the contours of chamber 17. Moreover, disk 25 may have a slightly rounded upper surface to assist in positioning of the ball which will be discussed hereinafter. In addition, rod 27 may include appropriate sealing means such as O-rings 20 and 25 or the like. Moreover, a spring (not shown) may also be used to bias rod 27 into the inactive position, as shown in FIG. 1. However, in some cases such a spring may be omitted.

At the upper end of chamber 17, there is provided a slightly larger chamber 19 which effectively establishes a valve seat 40 between chambers 17 and 19. This valve seat is disposed between the inlet conduit 15 and the outlet conduit 16.

Above the chamber 19 is a tapered portion 18 which communicates with and essentially forms a portion of chamber 19. The funnel-like portion 18 tapers outwardly at the top and joins with channel 20. Channel 20 is a ledge or shoulder which is provided around the inner circumference of casing 11. Thus, an open chamber 50 is provided above the central chambers 17 and 18. The channel 20 has a slightly dished configuration so that the ball 30 can rest therein. Moreover, in the preferred embodiment, the channel 20 has a slight tilt in that the outer perimeter of channel 20 is elevated slightly relative to the inner diameter thereof. Channel 20 permits the ball 30 to rest therein and yet be free to rotate around the interior of casing 11 while effectively rolling in channel 20.

A diverter 21 is mounted adjacent to channel 20. While a single diverter 21 is shown, a plurality thereof can be included, if desired. Moreover, the diverter can be placed within the confines of channel 20, per se, or as a portion of the interior wall of casing 11, e.g. slightly above channel 20. Diverter 21 is used to deflect a rolling ball 30 out of the channel 20 and into chamber 19 onto valve seat 40 at the appropriate moment.

The upper cap 12 is, generally, threadedly engaged with the upper portion of casing 11. In addition, a suitable gasket 60 or the like can be provided in order to effect a fluid-tight seal.

In operation, it is assumed that the valve is assembled as shown, with ball 30 resting in channel 20. Thus, with the ball in the channel and the rod 27 retracted, the inlet pipe 13 communicates with the outlet pipe 14 via inlet conduit 15, outlet conduit 16 and chambers 17 and 19. The fluid can fill other portions of the interior of casing 11 without ill affect.

If now it is assumed that an undesirable shock is produced, the valve 10 including casing 11 will shake, vibrate, jiggle or the like. Depending upon the type of tremor which is produced, ball 30 will be immediately jostled out of channel 20 and into chamber 19 or, conversely, ball 30 will tend to roll around channel 20 as a result of the shock force. (That is, the shock force can be a shear force, a rolling force or a circular force depending upon the tremor which produces the shock wave.) In the event of a shear shock, the ball will be deposited immediately from channel 20 into chamber 19 thereby seating with valve seat 40 (as shown by phantom lines). This operates to effectively seal the valve. The inlet source will apply pressure which will merely tend to force ball 13 into a snugger relationship to the valve seat thereby cutting off the flow to the outlet pipe.

In the case of the rolling or circular shock, the ball 30 will roll around channel 20 until it encounters a diverter 21. In the event that the rolling shock is of substantial consequence, the ball 30 will strike diverter 21 with sufficient force that the ball is dislodged out of channel 20 and into chamber 19 thereby effecting the seal as before.

It is noted that the channel configurations shown and described permit the valve to operate automatically to close a fluid line in response to a shock wave of a prescribed force. However, the valve is not undesirably closed in response to minor shaking or shock such as might be caused by passing vehicular traffic.

If it is assumed that the ball 30 is in the position in chamber 19 as shown in phantom outline, the valve can be reopened for fluid flow therethrough through either of two procedures. That is, the cap 12 can be removed and ball 30 relocated into channel 20. However, this is not typically expected. That is, a utility seal can be placed on the valve to prevent tampering or to void the warranty if the cap is improperly removed. Rather, to reset the valve, rod 27 is moved by applying upward pressure at cross member 26. As rod 27 moves upwardly, the disk 25 engages the bottom of ball 30 thereby raising the ball through chamber 19 and tapered chamber 18 until the ball is above the inner lip of channel 20. By this means of this operation, the ball can be relocated into channel 20. While not essential, the provision of a slightly convex upper surface at disk 25 will cause the ball 30 to roll off of the disk and into channel 20.

It should be noted, as well, that a sudden surge in fluid pressure will also tend to cause ball 30 to roll in channel 20. When ball 30 encounters diverter 21, it will again be deposited into chamber 19 as noted above.

Thus, there is shown and described a new and unique valve apparatus which is simpler and less costly than any other valve known in the art. The valve is readily and simply tested and reset. Preferred embodiments and configurations are shown and described. It is understood that those skilled in the art may conceive of modifications to the specific embodiments shown. However, any such modifications which fall within the purview of this illustrative embodiment, are intended to be included therein as well. The scope of the invention is limited only by the claims appended hereto.

Having thus described a preferred embodiment, what is claimed is:

1. An automatic shut-off valve comprising,
   a valve body with a central chamber therein,
   inlet and outlet means communicating with said central chamber,
   arcuate channel means having a substantially annular configuration and disposed within said valve body adjacent to and substantially encircling one end of said central chamber, and
   actuator means disposed in said channel means until selectively dislodged therefrom into said central chamber between said inlet and outlet means to interrupt fluid flow therethrough.
2. The valve recited in claim 1, including,
   tapered chamber means between said channel means and said central chamber.
3. The valve recited in claim 1 wherein said central chamber includes seating means for receiving said actuator means to provide a secure sealing effect.
4. The valve recited in claim 1 including,
   reseating means communicating with said central chamber to selectively engage and move said actuator means.
5. The valve recited in claim 4 wherein,
   said reseating means include a rod which passes upwardly through said central chamber.
6. The valve recited in claims 1 wherein,
   said actuator means is a spherical object.
7. The valve recited in claim 1 wherein,
   said inlet means is disposed above said outlet means in relation to said central chamber.
8. The valve recited in claim 1 wherein,
   said inlet means and said outlet means comprise tubing members.
9. The valve recited in claim 1 including,
   diverter means adjacent to said channel means for selectively dislodging said actuator means.
10. The valve recited in claim 1 including,
    cap means for closing the top of said valve body.

* * * * *